(12) United States Patent
Yamazaki et al.

(10) Patent No.: US 9,334,414 B2
(45) Date of Patent: May 10, 2016

(54) INK JET RECORDING METHOD AND INK SET

(71) Applicant: Seiko Epson Corporation, Tokyo (JP)

(72) Inventors: Soichi Yamazaki, Shiojiri (JP); Akio Ito, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/672,602

(22) Filed: Mar. 30, 2015

(65) Prior Publication Data

US 2015/0275014 A1    Oct. 1, 2015

(30) Foreign Application Priority Data

Mar. 31, 2014  (JP) ................................. 2014-070977

(51) Int. Cl.
| | | |
|---|---|---|
| *G01D 11/00* | (2006.01) | |
| *C09D 11/00* | (2014.01) | |
| *C09D 11/40* | (2014.01) | |
| *C09D 11/033* | (2014.01) | |
| *C09D 11/107* | (2014.01) | |

(52) U.S. Cl.
CPC .............. *C09D 11/40* (2013.01); *C09D 11/033* (2013.01); *C09D 11/107* (2013.01)

(58) Field of Classification Search
CPC ........ C09D 11/38; C09D 11/40; C09D 11/50; C09D 11/326
USPC .................... 347/100; 106/31.13, 31.6, 31.85
See application file for complete search history.

(56) References Cited

U.S. PATENT DOCUMENTS

| | | | | |
|---|---|---|---|---|
| 6,926,766 | B2 * | 8/2005 | Pistagna ................ | C09D 11/38 106/31.58 |
| 7,695,127 | B2 * | 4/2010 | Sekiguchi .............. | C09D 11/38 347/100 |
| 8,784,549 | B2 * | 7/2014 | Bermel ................ | C09D 11/322 106/31.6 |
| 8,814,337 | B2 * | 8/2014 | Szajewski ............ | C09D 11/326 347/100 |
| 2008/0207805 | A1 * | 8/2008 | Blease ................... | C09D 11/40 524/145 |
| 2014/0374671 | A1 * | 12/2014 | Chopra ................ | C09D 11/106 252/514 |

FOREIGN PATENT DOCUMENTS

JP         2013-107224 A     6/2013

* cited by examiner

*Primary Examiner* — Anh T. N. Vo
(74) *Attorney, Agent, or Firm* — Harness, Dickey & Pierce, P.L.C.

(57) ABSTRACT

In an ink jet recording method, one pass printing recording is performed by using two or more kinds of inks, static surface tension differences between two or more kinds of inks are all 2 mN/m or lower, and the ink having the lowest L* value is printed first, and the ink having the highest L* value is printed last.

13 Claims, 2 Drawing Sheets

INK JET RECORDING METHOD AND INK SET

BACKGROUND

1. Technical Field

The invention relates to an ink jet recording method and an ink set preferable for the ink jet recording method.

2. Related Art

As one printing apparatus that forms images by ejecting inks onto recording media, there is known an ink jet printer. In addition, among the ink jet printers, as a printer that can perform high speed printing, a line printer has been used. The line printer uses one or more printing heads (hereinafter, referred to as a "line head") that realize nozzle arrays having lengths corresponding to the length of the recording medium in the width direction (direction orthogonal to transportation direction), transports the recording medium to the line heads, and performs printing on the recording medium without the movement of the line heads in the direction orthogonal to the transportation direction.

In the line printer having the configuration, since printing is performed generally in one pass without performing two or more instances of superimposed printing, the ink weight of one dot has to be great in order to secure solid filling. Then, there is a problem in that a bleeding phenomenon between inks easily occurs.

As means for solving the problem, an image recording method of forming an image by causing the dynamic surface tensions of respective inks used in a line printer to be 37 mN/m to 48 mN/m, and ejecting two or more kinds of inks between which the dynamic surface tension differences are all 2 mN/m or greater in a sequence beginning with an ink having a larger dynamic surface tension has been proposed in JP-A-2013-107224.

However, in the technique disclosed in JPA-2013-107224, the generation of bleeding between black and colors is suppressed, but the bleeding between colors widely occurs. The bleeding of black ink is okay as long as the black ink is not spread to the color inks (that is, the color inks may be spread to the black ink), but the bleeding between colors may not be generated in a manner in which at least three colors of inks spread to each other.

In addition, in the line printer, since the ink weight of one dot has to be great in order to secure the solid filling thereof, in the inks in which only the dynamic surface tension is controlled as in the inks disclosed in JP-A-2013-107224, bleed-through of the inks in the recording medium may occur. In addition, the "bleed-through" in the specification refers to a state in which the ink permeates the recording medium to the backside.

After the ink droplet lands on the recording medium to reach the equilibrium state, the static surface tension is more dominant than the dynamic surface tension of the ink. That is, before the ink droplet reaches the equilibrium state, since amphiphilic substances such as a surfactant are not regularly oriented on the gas-liquid interface of the ink droplet, the dynamic surface tension becomes dominant. Meanwhile, after the ink droplet reaches to an equilibrium state, amphiphilic substances are regularly oriented on the gas-liquid interface of the ink droplet, and thus the static surface tension becomes more dominant.

SUMMARY

An advantage of some aspects of the invention is to provide an ink jet recording method in which when one pass printing recording is performed, the generation of the bleeding between color inks is suppressed and the bleed-through of the inks in the recording medium can be prevented and to provide an ink set preferable for the ink jet recording method.

The invention is can be realized by the following forms and application examples.

Application Example 1

According to an aspect of the invention, there is provided an ink jet recording method in which one pass printing recording is performed by using two or more kinds of inks, static surface tension differences between two or more kinds of inks are all 2 mN/m or lower, in which the ink having the lowest $L^*$ value is printed first, and the ink having the highest $L^*$ value is printed last.

As described above, after the ink droplet lands on a recording medium and reaches an equilibrium state, amphiphilic substances are oriented on the gas-liquid interface of the ink droplet, and thus the static surface tension becomes more dominant than the dynamic surface tension. Therefore, if the static surface tension differences of the respective used inks are all 2 mN/m or lower, and the ink having the lowest $L^*$ value is printed first, and the ink having the highest $L^*$ value is printed last, the generation of the bleeding between colors or the aggregation thereof can be suppressed to realize high quality in the colors. In addition, if the static surface tension differences of the respective used inks are all 2 mN/m or lower, the bleed-through of the inks can be suppressed.

Application Example 2

In the ink jet recording method according to Application Example 1, a dynamic surface tension of each of the two or more inks when a surface life span is 10 ms may be in a range of 37 mN/m to 48 mN/m.

According to the ink jet recording method of Application Example 2, the disturbance (satellite) in the image formation caused by the separation from the ejection of the ink droplet before landing on the recording medium is not likely to occur.

Application Example 3

In the ink jet recording method according to Application Examples 1 or 2, each of the two or more inks may contain an ethylene oxide adduct of acetylene glycol and 2,4-diethyl-1,5-pentanediol.

According to the ink jet recording method of Application Example 3, if the ethylene oxide adduct of acetylene glycol and 2,4-diethyl-1,5-pentanediol are added, the static surface tension differences of the respective inks can be easily matched to 2 mN/m or lower and particularly the color bleeding can be effectively suppressed. In addition, if the components are added, the bleed-through of the inks can be effectively suppressed.

Application Example 4

In the ink jet recording method according to any one of Application Examples 1 to 3, each of the two or more inks may contain a diol-based solvent, in which a content of the diol-based solvent is greater in the ink having the highest $L^*$ value than in the ink having the lowest $L^*$ value.

If the diol-based solvent is added to the ink, the dynamic surface tension of the ink is caused to be low. Right after the ink droplet lands on the recording medium, the dynamic surface tension is still more dominant than the static surface tension. If the printing is performed in a sequence beginning with the ink having the higher dynamic surface tension, the generation of the bleeding between black and colors or between colors or the aggregation thereof can be effectively suppressed. Therefore, if the dynamic surface tension of the ink having the lowest L* value which is first printed is caused to be higher than that of the ink having the highest L* value by adding the diol-based solvent, the generation of the bleeding between colors or the aggregation can be effectively suppressed.

Application Example 5

In the ink jet recording method according to Application Examples 1 to 4, each of the two or more inks may contain an ether-based solvent, and a content of the ether-based solvent may be smaller in the ink having the highest L* value than in the ink having the lowest L* value.

If the ether-based solvent is added to the ink, the dynamic surface tension of the ink is increased. In the same manner as in the case of Application Example 4, if the dynamic surface tension of the ink having the lowest L* value which is first printed is caused to be higher than that of the ink having the highest L* value by adding the ether-based solvent, the generation of the bleeding between black and colors or between colors or the aggregation can be effectively suppressed.

Application Example 6

According to another aspect of the invention, there is provided an ink set used in the ink jet recording method according to any one of Application Examples 1 to 5, including a black ink, a cyan ink, a magenta ink, and a yellow ink; in which a dynamic surface tension when a surface life span of each of the inks is 10 ms is 37 mN/m to 48 mN/m, and static surface tension differences of inks are all 2 mN/m or lower.

According to the ink set of Application Example 6, in the ink jet recording method that performs one pass printing recording, the generation of the bleeding between colors or the aggregation can be suppressed so as to realize high quality in the colors. In addition, the bleed-through of the inks can be suppressed.

Application Example 7

In the ink set of Application Example 6, each of the inks may contain an ethylene oxide adduct of acetylene glycol and 2,4-diethyl-1,5-pentanediol.

According to the ink set of Application Example 7, if the ethylene oxide adduct of acetylene glycol and 2,4-diethyl-1, 5-pentanediol are added, the static surface tension differences of the respective inks can be easily matched to 2 mN/m or lower and particularly the color bleeding can be effectively suppressed. In addition, the bleed-through of the inks can be all effectively suppressed.

Application Example 8

In the ink set according to Application Example 6 or 7, each of the inks may contain a diol-based solvent, and a content of the diol-based solvent may be greater in the yellow ink than in the black ink.

If the diol-based solvent is added to the ink, the dynamic surface tension of the ink can be caused to be low. Right after the ink droplet lands on the recording medium, the dynamic surface tension is still more dominant than the static surface tension. If the printing is performed in a sequence beginning with the ink having the higher dynamic surface tension, the generation of the bleeding between colors or the aggregation thereof can be effectively suppressed. Therefore, if the dynamic surface tension of the black ink having the lowest L* value which is first printed is caused to be higher than that of the yellow ink having the highest L* value by adding the diol-based solvent, the generation of the bleeding between black and colors or between colors or the aggregation thereof can be effectively suppressed.

Application Example 9

In the ink set according to any one of Application Examples 6 to 8, each of the inks may contain an ether-based solvent, and a content of the ether-based solvent may be smaller in the yellow ink than in the black ink.

The dynamic surface tension of the ink can be caused to be higher by adding the ether-based solvent to the ink. Therefore, in the same manner as in the case of Application Example 8, if the dynamic surface tension of the ink having the lowest L* value which is first printed is caused to be higher than that of the ink having the highest L* value by adding the ether-based solvent, the generation of the bleeding between black and colors or between colors or the aggregation thereof can be effectively suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention are described. Embodiments of the invention described below are described as examples of the invention. Also, the invention is not limited to the embodiments below, but includes various modification examples which are realized without departing from the gist of the invention.

1. Ink Jet Recording Method

An ink jet recording method according to an embodiment is an ink jet recording method in which one pass printing recording is performed using two kinds of inks without performing two instances or more of superimposed printing using the same ink. The static surface tension differences between two or more kinds of inks are all 2 mN/m or lower. The ink having the lowest L* value is printed first and the ink having the highest L* value is printed last. Hereinafter, the characteristics of the ink jet recording apparatus, the ink set, and the ink jet recording method which are used in the ink jet recording method according to the embodiment are sequentially described.

1.1. Ink Jet Recording Apparatus

The ink jet recording apparatus used in the ink jet recording method according to the embodiment may be an ink jet recording apparatus that can perform one pass printing recording, particularly without performing two instances or more of superimposed printing using the same ink. Examples thereof include a line head-type ink jet recording apparatus.

Figure 1:
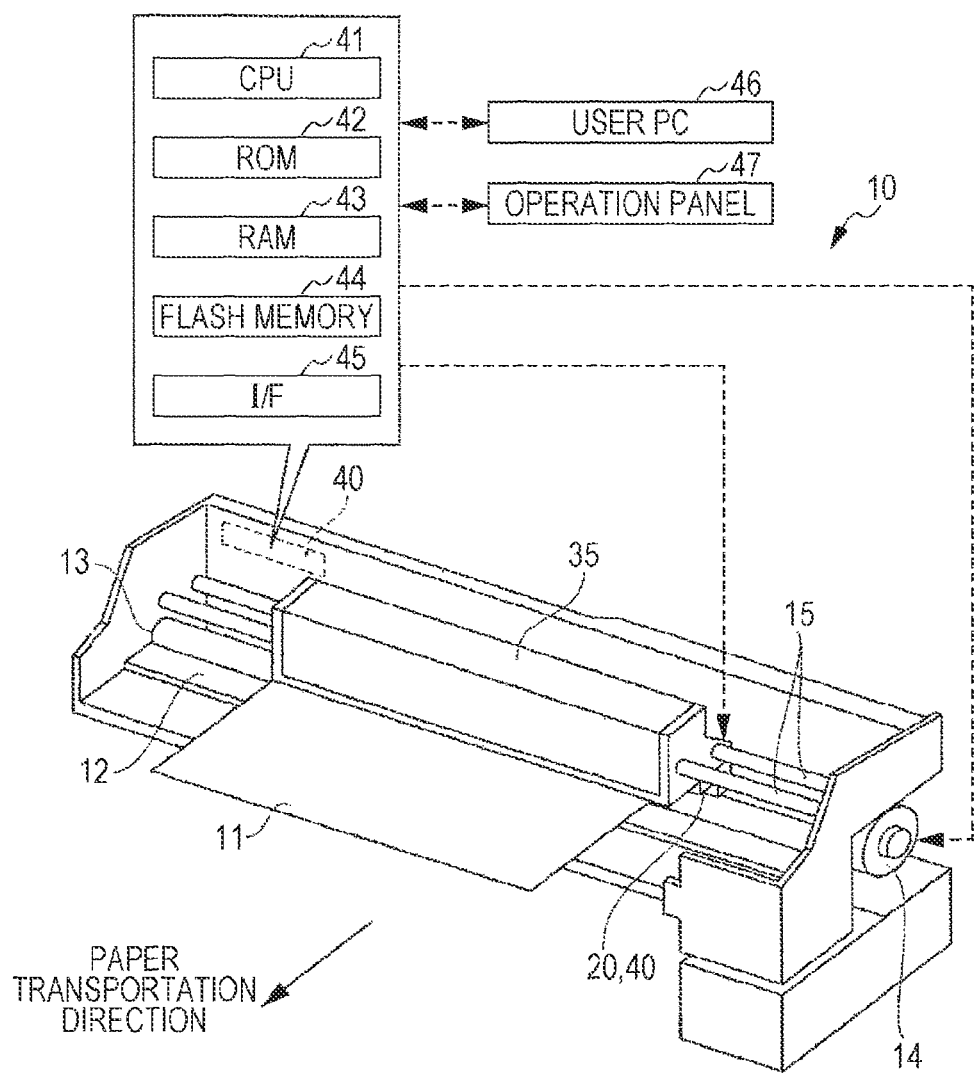
FIG. 1 is an explanatory drawing schematically illustrating a configuration of an ink jet recording apparatus including a line head.

Hereinafter, an example of the ink jet recording apparatus including a line head is described with reference to the drawings. FIG. 1 is an explanatory drawing schematically illustrating a configuration of the ink jet recording apparatus including the line head.

As illustrated in FIG. 1, an ink jet recording apparatus 10 includes a transportation roller 13 that transports a recording paper 11 onto a platen 12, a step motor 14 that rotates the transportation roller 13, a line head 20 that ejects ink droplets onto the recording paper 11 mounted movably in a direction perpendicular to a paper transportation direction (arrow direction of FIG. 1) of the recording paper 11 by a guide rail 15 and is transported, a vibrating element (not illustrated) that vibrates the line head 20 in a direction perpendicular to the transportation direction of the recording paper 11, an ink cartridge 35, and a controller 40 that controls all apparatuses.

The vibrating element is formed with, for example, a piezoelectric element (electrostrictive vibrator) such as PZT and attached to the line head 20. Accordingly, the line head 20 can be vibrated in a direction perpendicular to the transportation direction of the recording paper 11 along the guide rail 15 by vibrating the vibrating element.

The controller 40 is configured with a microprocessor mainly configured with a CPU 41, and includes a ROM 42 that stores various process programs, a RAM 43 that temporarily stores data, a flash memory 44 that can write and erase data, an interface (I/F) 45 that exchanges information with external devices, and an input and output port (not illustrated), in addition to the CPU 41.

In the RAM 43, a print buffer area is provided so that data for printing received from a user PC 46 via the interface (I/F) 45 can be stored in the print buffer area. Various operation signals and the like from an operation panel 47 are input to the controller 40 via an input port, and a driving signal to the line head 20, a driving signal to the step motor 14, an output signal to the operation panel 47, or the like is output from the controller 40 via an output port.

In addition, the operation panel 47 is a device for inputting various instructions from a user and displaying and outputting states, and though not illustrated, a display for displaying characters, diagrams, or symbols corresponding to various instructions or buttons for causing the user to perform various operations are installed.

Figure 2:
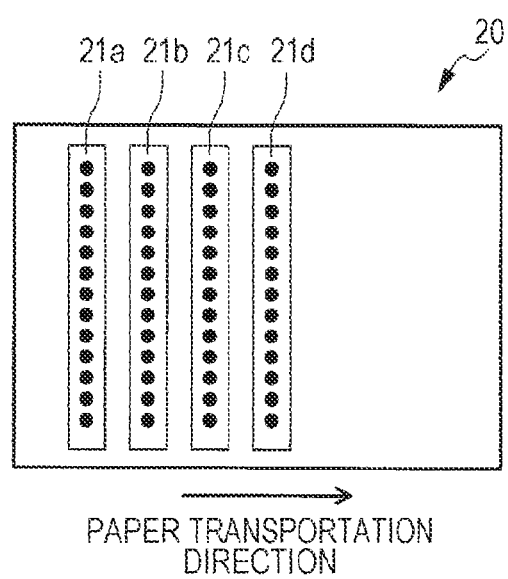
FIG. 2 is a plan view schematically illustrating a structure of the line head.

FIG. 2 is a plan view schematically illustrating a structure of a line head. As illustrated in FIG. 2, the line head 20 includes nozzle arrays 21a, 21b, 21c, and 21d in which plural nozzles are arranged in a direction perpendicular to the paper transportation direction, and has a recording area wider than the width of the transported recording paper 11 so that an image for one line can be collectively recorded on the transported recording paper 11.

In addition, as an ejecting method of the ink from the line head 20, in the example of FIG. 1, a method of ejecting a droplet of an ink by using pressure generated in an ink pressure chamber of the line head through the vibrating element (not illustrated) is employed. However, the invention is not limited thereto, and various methods such as thermal ink jet method of causing a heating element to generate bubbles and applying pressure to eject the ink, and the like can also be applied.

The ink jet recording apparatus 10 forms an image on a recording medium by sequentially using the nozzle arrays 21a, 21b, 21c, and 21d. In the ink jet recording method according to the embodiment, it is required that the ink having the lowest L* value is printed first and the ink having the highest L* value is printed last, the ink having the lowest L* value may be ejected from the nozzle array 21a on the farthest upstream side and the ink having the highest L* value may be ejected from the nozzle array 21d on the farthest downstream side.

In addition, a configuration in which the inks are arranged from the upper stream side in a sequence beginning with the ink having a low L* value by setting the ink having the second lowest L* value to be the nozzle array 21b and setting the ink having the third lowest L* value to be the nozzle array 21c is preferable. According to the configuration, the generation of the bleeding between colors or the aggregation is effectively suppressed so as to realize high quality in the colors.

1.2. Ink Set

In the ink jet recording method according to the embodiment, two or more kinds of inks are used. In the specification, the combination of two or more kinds of inks is referred to as an ink set. The number of inks is not particularly limited, as long as the number is two or higher. However, since an expressible color gamut (gamut volume) can be expanded, it is preferable to use an ink set having at least four kinds of inks: a black ink, a cyan ink, a magenta ink, and a yellow ink.

The respective inks include at least a pigment, a water soluble organic solvent, and water. Also, a surfactant, a resin emulsion, a pH regulator, or other additives may be added to the ink, if necessary. Hereinafter, respective components included in the ink are described.

Pigment

The respective inks that configure the ink set according to the embodiment contain pigments. The kind of the pigment is not particularly limited, and various kinds of pigments can be used as described below.

Examples of the pigment that can be contained in the yellow ink include C.I. Pigment Yellows 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180, and 198.

Examples of the pigment that can be contained in the magenta ink include C.I. Pigment Reds 1, 3, 5, 8, 9, 16, 17, 19, 22, 38, 48:3, 57:1, 90, 112, 122, 123, 127, 146, 184, 202, 269; C.I. Pigment Violets 1, 3, 5:1, 16, 19, 23, 38; and a solid solution of C.I. Pigment Violets 19, and C.I. Pigment Reds 202.

Examples of the pigment that can be contained in the cyan ink include C.I. Pigment Blues 1, 2, 15, 15:1, 15:2, 15:3, 15:4, and 16.

Examples of the pigment that can be contained in the black ink include C.I. Pigment Blacks 4 and 7.

Specific examples of the other color pigments include an orange pigment such as C.I. Pigment Oranges 34, 36, 43, 61, 63, and 71, and a green pigment such as C.I. Pigment Greens 7, 10, 36, 37, and 58.

The respective inks that configure the ink set according to the embodiment can be used as resin dispersion pigments in which the pigments are dispersed in dispersion resins described below. In addition, as the respective inks that configure the ink set according to the embodiment, self dispersion pigments may be used without using the dispersion resins.

The self dispersion pigment refers to a pigment that can be dispersed and/or dissolved in an aqueous medium without a dispersant. Here, the expression "being dispersed and/or dissolved in an aqueous medium without a dispersant" refers to a state of stably existing in an aqueous medium by using a hydrophilic group on the surface thereof without using a dispersant for dispersing a pigment.

The ink containing a self dispersion pigment as a colorant does not have to contain a dispersion resin for dispersing a general pigment. Therefore, there is little foam generated by the decrease of the defoaming properties caused by the dispersion resin, and the ink having excellent ejection stability is easily prepared. In addition, since the significant increase of the viscosity caused by the dispersion resin is suppressed, it is possible to contain more pigments so that the print density can be sufficiently increased. Therefore, the handling is easy.

The self dispersion pigment is manufactured by, for example, performing a physical treatment or a chemical treatment on the pigment so that a phosphorus-containing group is bonded (grafted) to the surface of the pigment. Examples of the physical treatment include a vacuum plasma treatment. In addition, examples of the chemical treatment include a wet oxidation process of performing oxidization by an oxidant in water or a method of bonding a carboxyl group via a phenyl group by bonding p-aminobenzoate to the surface of the pigment.

In view of the high coloring properties, the respective inks that configure the ink set according to the embodiment are preferably self dispersion pigments having phosphorus-containing groups via a phenyl group on the surface of the pigment. As the surface treatment means for causing the phosphorus-containing group to be bonded to the surface of the pigment via the phenyl group, various kinds of well-known surface treatment means can be applied. Examples thereof include a method of bonding the phosphorus-containing group via the phenyl group by bonding sulfanilic acid, p-aminobenzoate, and 4-aminosalicylic acid to the surface of the pigment.

The content of each of the pigments included in the respective inks is preferably in the range of 2% by mass to 15% by mass with respect to the total amount of the ink, and is more preferably in the range of 4% by mass to 9% by mass.

Dispersion Resin

The respective inks that configure the ink set according to the embodiment contain the dispersion resin for dispersing the pigment when the self dispersion pigment is not used. The dispersion resin is not particularly limited, but the inks preferably contain the dispersion resin of which the weight average molecular weight is in the range of 70,000 to 100,000 and the resin acid value is in the range of 80 mgKOH/g to 120 mgKOH/g. The dispersion stability of the pigment in the ink becomes excellent by containing the dispersion resin, so that the aggregation of the pigment can be suppressed.

If the weight average molecular weight of the dispersion resin is at the lower limit or higher, the effect of suppressing the pigment from permeating the surface of the paper can be easily achieved. If the weight average molecular weight is at the higher limit or lower, the dispersion stability of the pigment becomes excellent. In addition, the weight average molecular weight can be measured, for example, by using gel permeation chromatography (GPC) using tetrahydrofuran as a solvent and is calculated using the polystyrene conversion molecular weight.

In addition, if the resin acid value of the dispersion resin is at the lower limit or greater, the balance between hydrophilicity and hydrophobicity becomes excellent and exhibits the effect in which the dispersion stability of the pigment becomes excellent. If the resin acid value is the higher limit or less, the effect suppressing the pigment from permeating the surface of the paper can be easily exhibited.

Examples of the dispersion resin include polyvinyl alcohols, polyvinylpyrrolidones, poly(meth)acrylate, a (meth)acrylate-acrylonitrile copolymer, a vinyl acetate-(meth)acrylate copolymer, a vinyl acetate-(meth)acrylic ester copolymer, a (meth)acrylate-(meth)acrylic ester copolymer, a styrene-(meth)acrylate copolymer, a styrene-(meth)acrylate-(meth)acrylic ester copolymer, a styrene-α-methylstyrene-(meth)acrylate copolymer, a styrene-α-methylstyrene-(meth)acrylate-(meth)acrylic ester copolymer, a styrene-maleate copolymer, a styrene-maleic anhydride copolymer, a vinylnaphthalene-(meth)acrylate copolymer, a vinylnaphthalene-maleate copolymer, a vinyl acetate-maleate ester copolymer, a vinyl acetate-crotonate copolymer, and the salts thereof. In addition, in the specification, the description of (meth)acrylate refers to acrylate or methacrylate. The embodiment of the copolymer may use any one of a random copolymer, a block copolymer, an alternating copolymer, and a graft copolymer.

The salts thereof include the salts of ammonia, ethylamine, diethylamine, triethylamine, propylamine, isopropylamine, dipropylamine, butylamine, isobutylamine, diethanolamine, triethanolamine, tri-iso-propanolamine, aminomethyl propanol, morpholine with a basic compound.

The dispersion resin described above may use the materials singly or two or more types thereof may be used in combination.

The contents of the dispersion resins included in the respective inks are preferably in the range of 0.5% by mass to 5.0% by mass and more preferably in the range of 0.8% by mass to 3.0% by mass with respect to the total amount of the respective color inks. If the content of the dispersion resin is in the above range, the effect in which the dispersion stability of the pigment becomes excellent can be sufficiently obtained.

A method of preparing the pigment dispersant including the pigment and the dispersion resin can be properly selected from the well-known methods in the related art. An appropriate method is, for example, a method of obtaining the pigment dispersant by kneading the pigment and the dispersion resin in an appropriate liquid medium such as water by using a media wet disperser such as Nano Grain Mill (manufactured by Asada Iron Works, Co., Ltd.), MSC Mill (manufactured by Mitsui Mining Company, Limited), Dyno Mill (manufactured by Shinmaru Enterprises Corporation), or a sand mill (manufactured by Yasukawa Seisaku-sho K.K). In the treatment using the media wet disperser, beads having small diameters are used. The particle diameters of the beads are not particularly limited, but are typically in the range of 0.5 mm to 2.0 mm. In addition, the materials of the beads are not particularly limited, but beads made of solid materials such as zirconia beads and glass beads are used.

Water

The respective inks that configure the ink set according to the embodiment contain water as a main solvent. As water, pure water such as ion exchanged water, ultrafiltrated water, reverse osmosis water, or distilled water or ultrapure water is preferably used. Particularly, if water sterilized by being irradiated with ultraviolet rays, adding hydrogen peroxide, or the like is used, the generation of fungus or bacteria is prevented and long term preservation of the ink becomes possible. The content of water in the respective ink is preferably in the range of 20% by mass to 70% by mass with respect to the total mass of the ink.

Water Soluble Organic Solvent

The respective inks that configure the ink set according to the embodiment contain a water soluble organic solvent. Since the dynamic surface tension of the ink can be easily adjusted, a diol-based solvent and an ether-based solvent are preferable as the water soluble organic solvent.

The diol-based solvent is not particularly limited, but a highly permeable diol-based solvent such as 1,2-alkanediol in which the polar groups are unevenly distributed is preferable. Examples of the diol-based solvent include alkanediol having 5 to 9 carbon atoms such as 1,2-hexylene glycol, 1,2-pentanediol, 1,2-hexanediol, 1,2-heptanediol, 1,2-octanediol, 2-ethyl-1,3-hexanediol, 2,4-diethyl-1,5-pentanediol, and 2-ethyl-2-butyl-1,3-propanediol. One of the diol-based solvents may be used singly or two or more types thereof may be used in combination.

The dynamic surface tension of the ink can be decreased by adding a diol-based solvent to the ink. Immediately after the ink droplet has landed on the recording medium, the dynamic surface tension is more dominant than the static surface tension. If the printing is performed in a sequence beginning with the ink having the higher dynamic surface tension, the generation of the bleeding between black and colors or between colors or the aggregation thereof can be effectively suppressed. Therefore, the dynamic surface tension of the ink having the lowest L* value which is first printed is caused to be higher than that of the ink having the highest L* value by adding the diol-based solvent so that the generation of the bleeding between colors or the aggregation can be effectively suppressed.

In addition, among the diol-based solvents described above, 2,4-diethyl-1,5-pentanediol causes the dynamic surface tension of the ink to be low, and easily causes the static surface tension difference between the respective inks to be matched to be 2 mN/m or lower so that the color bleeding can be effectively suppressed. In addition, permeability of ink into the recording medium can be controlled by adding 2,4-diethyl-1,5-pentanediol to the ink so that the bleed-through can be also effectively prevented.

Examples of the ether-based solvent include ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, and polyoxyethylene 2-ethylhexyl ether. The ether-based solvents may be used singly or two or more types thereof may be used in combination.

The dynamic surface tension of the ink can be increased by adding the ether-based solvent to the ink. Therefore, the dynamic surface tension of the ink having the lowest L* value which is first printed is caused to be higher than that of the ink having the highest L* value by adding the ether-based solvent so that the generation of the bleeding between black and colors or between colors or the aggregation thereof can be effectively suppressed.

In addition, a compound having both an ether bond and diol exists in the structure. For example, a diol type compound of alkyl ether described above or an alkylene oxide adduct of the acetylene glycol is included therein. According to the invention, the compounds are treated as the diol-based solvent and the ether-based solvent. That is, when the compound having both of the ether bond and diol is added, the content thereof is counted as the content of the diol-based solvent and the content of the ether-based solvent.

The dynamic surface tension when the surface life spans of the respective inks are 10 ms is preferably adjusted to be in the range of 37 mN/m to 48 mN/m by adding the diol-based solvent or the ether-based solvent to the ink. If the dynamic surface tension of the ink is caused to be in the range above, the disturbance (satellite) in the image formation caused by the separation beginning with the ejection of the ink droplet until the landing thereof on the recording medium is not likely to occur.

The "dynamic surface tension" according to the invention refers to the surface tension right after the liquid surface (gas-liquid interface) is formed and when the liquid surface is in the non-equilibrium state. In addition, the "surface life span" refers to the elapsed time from the formation of the liquid surface. The respective components of the ink are diffused on the liquid surface according to the decrease of the surface life span, and the liquid surface approaches the equilibrium state. The "static surface tension" refers to the surface tension when the liquid surface is in the equilibrium state.

The method of measuring the dynamic surface tension of the ink can be performed by using a dynamic surface tensiometer. Examples of the dynamic surface tensiometer include a bubble pressure dynamic surface tensiometer (Model "BP100" manufactured by KRUSS).

The method of controlling the static surface tension of the ink can be measured by the automatic surface tensiometer (Model "DY-300" manufactured by Kyowa Interface Science Co., Ltd.) by using a platinum plate.

In addition, a water soluble organic solvent is preferably added to the respective inks that configure the ink set according to the embodiment, as a moisturizing agent. Examples of the moisturizing agent include glycerine, 2-pyrrolidone, N-methyl-2-pyrrolidone, and γ-butyrolactone. The moisturizing agents may be used singly or two or more types thereof may be used in combination. If the ink contains the moisturizing agent, the content of the moisturizing agent is preferably in the range of 5% by mass to 30% by mass, and is more preferably in the range of 12% by mass to 20% by mass with respect to the total mass of the ink.

Surfactant

A surfactant is preferably added to the respective inks that configure the ink set according to the embodiment. The static surface tension of the ink can be adjusted by adding the surfactant thereto. That is, the static surface tension refers to the surface tension when the liquid surface is in the equilibrium state, but if the ink to which the surfactant is added is in the equilibrium state, the surfactant is regularly oriented on the gas-liquid interface of the ink droplet. Therefore, since the effect of the surfactant is dominant in the static surface tension, the static surface tensions of the inks are desirably matched by adding the surfactant in order to matching the static surface tensions of the respective inks to be 2 mN/m or lower.

The surfactant is not particularly limited, and any one of an anionic surfactant, a cationic surfactant, an amphoteric surfactant, and a non-ionic surfactant can be used. Among these, since the ink having less foam or bubbles can be obtained, the non-ionic surfactant is preferable. The non-ionic surfactant has an effect of evenly spreading the ink on the recording medium. Therefore, if the ink jet recording is performed by using the ink containing the non-ionic surfactant, a high definition image having less permeation can be obtained.

Among the non-ionic surfactants, the alkylene oxide adduct of the acetylene glycol (hereinafter the alkylene oxide adduct may be also referred to as "AO adduct") is more preferable. Since the AO adduct of acetylene glycol has a structure having both the hydroxyl group and the ether group, the compatibility between the diol-based solvent and the ether-based solvent described above is excellent, and defects in the physical properties of the ink do not occur. In addition, the HLB value of the AO adduct of acetylene glycol is preferably in the range of 10 to 15 in order to further enhance the wettability thereof.

The AO adduct of acetylene glycol is not limited to the below, and the specific examples thereof include one obtained by adding alkylene oxide to an acetylene glycol-based diol such as 2,5-dimethyl-3-hexyne-2,5-diol, 2,5-dimethyl-2,5-hexanediol, 3,6-dimethyl-4-octyne-3,6-diol, or 2,4,7,9-tetramethyl-5-decyne-4,7-diol. Specific product names include Sufynol 440, Sufynol 104A.E.H, and Olfine which are obtained by adding alkylene oxide to Sufynol 104 manufactured by Nissin Chemical Co., Ltd.

The surfactant may be used singly or two or more types thereof may be included in combination. The content of the surfactants in the respective inks are preferably in the range of 0.5% by mass to 5% by mass with respect to the total mass of the ink.

In addition, the respective inks that configure the ink set according to the embodiment are preferably inks of which the static surface tension differences between the respective inks are matched to 2 mN/m or lower by adding the AO adduct of acetylene glycol and 2,4-diethyl-1,5-pentanediol. If these are added, the inks become preferable in that the static surface tension differences of the respective inks can be easily matched to 2 mN/m or lower and the generation of foam and bubbles is suppressed.

Resin Emulsion

The resin emulsion may be added to the respective inks that configure the ink set according to the embodiment. The resin emulsion has an effect of enhancing the fixability of the image portion in a recorded material since as the ink is dried, the fusion between resin particles or between the resin particles and the coloring components with each other is performed to fix the colorant to the recording medium.

The resin particles are preferably one or more selected from the group consisting of an acryl-based resin, a methacryl-based resin, a styrene-based resin, a urethane-based resin, an acrylamide-based resin, and an epoxy-based resin. These resins may be used as a homopolymer or as a copolymer.

The resin particle may use a resin particle having a single particle structure, or a resin particle having a core-shell structure configured with a core portion and a shell portion that encloses the core portion. According to the specification, the "core-shell structure" means a structure in which two or more polymers having different compositions exist in the particle in a phase separated manner. Accordingly, the particle may have a configuration in which the shell portion may completely cover the core portion, or may partially cover the core portion. In addition, a portion of the polymer of the shell portion forms a domain or the like in the core particle. Further, the particle may have a three or more layers of multiple layer structures including one or more layer having a different composition between the core portion and the shell portion.

The resin particle can be obtained by emulsion polymerization, which is well known. That is, the resin particles can be obtained by performing emulsion polymerization on the unsaturated vinyl monomer in water in which the polymerization catalyst and the emulsifier exist.

The unsaturated vinyl monomer includes acrylic ester, methacrylic ester, an aromatic vinyl compound, vinyl ester, a vinyl cyan compound, a halogen compound, olefins, and dienes which are generally used in the emulsion polymerization.

Further, specific examples include acrylic ester such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate; methacrylic ester such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl ester such as vinyl acetate; vinyl cyan compounds such as acrylonitrile and methacrylonitrile; a halogen compound such as vinylidene chloride and vinyl chloride; an aromatic vinyl compound such as styrene, α-methylstyrene, vinyl toluene, t-butylstyrene, chlorostyrene, vinylanisole, and vinylnaphthalene; olefins such as ethylene and propylene; dienes such as butadiene and chloroprene; vinyl monomers such as vinyl ether, vinyl ketone, and vinyl pyrrolidone; unsaturated carboxylate such as acrylate, methacrylate, itaconic acid, fumaric acid, and maleate; acrylamide such as acrylamide and N,N'-dimethylacrylamide; a hydroxyl group-containing monomer such as 2-hydroxyethyl acrylate, 2-hydroxypropyl acrylate, 2-hydroxyethyl methacrylate, and 2-hydroxypropyl methacrylate.

In addition, the resin particles having a structure of being interlinked by a cross-linking monomer having two or more polymerizable double bonds may be used as monomer-derived molecules. Examples of the cross-linking monomers having two or more polymerizable double bonds include diacrylate such as polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloyloxypropyloxyphenyl)propane, and 2,2'-bis(4-acryloyloxydiethoxyphenyl)propane; triacrylate such as trimethylolpropane triacrylate, trimethylolethane triacrylate, and tetramethylolmethane triacrylate; tetraacrylate such as ditrimethylol tetraacrylate, tetramethylolmethane tetraacrylate, and pentaerythritol tetraacrylate; hexaacrylate such as dipentaerythritol hexaacrylate; dimethacrylate such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxy diethoxyphenyl)propane; trimethacrylate such as trimethylolpropane trimethacrylate, and trimethylolethane trimethacrylate; methylenebisacrylamide; and divinylbenzene. The cross-linking monomers may be used singly, or two or more types thereof may be used in combination.

In addition, a polymerization initiator, an emulsifier, and a molecular weight regulator used in the emulsion polymerization can be used in a normal manner.

The polymerization initiators which are used in the same manner as those used in the general radical polymerization are used. Examples thereof include potassium persulfate, ammonium persulfate, hydrogen peroxide, azobisisobutyronitrile, benzoyl peroxide, dibutyl peroxide, peracetic acid, cumene hydroperoxide, t-butyl hydroperoxide, and paramenthane hydroperoxide. Particularly, when the polymerization reaction is performed in water, the aqueous polymerization initiator is preferable.

In addition to sodium lauryl sulfate, examples of the emulsifiers generally include ones used as anionic surfactants, non-ionic surfactants, or amphoteric surfactants, and the mixture thereof. The emulsifiers may be used singly or two or more types thereof may be used in combination.

If the resin particles are manufactured by using the emulsion polymerization, in the case where the polymer emulsion configured with the anionic resin particles is prepared by emulsion polymerization, since a negative polar group such as a carboxyl group or a sulfonate group exists on the surface of the resin particle, pH increases and becomes acidic, and the viscosity increase or the aggregation thereof easily occurs. Here, the neutralization by using the basic substance is generally performed. As the basic substance, ammonia, organic amines, inorganic hydroxide, and the like can be used. Among these, in view of the long term preservation stability and the ejection stability of the polymer emulsion and the magenta ink, univalent inorganic hydroxide (potassium hydroxide, sodium hydroxide, lithium hydroxide) is preferable. The added amount of the neutralizer is appropriate when the pH of the polymer emulsion is in the range of 7.5 to 9.5, and is preferably in the range of 7.5 to 8.5.

The diameter of the resin particles is preferably in the range of 5 nm to 400 nm, and more preferably in the range of 50 nm to 200 nm.

In addition, the added amount of the resin emulsions may be appropriately determined considering the fixability or the like thereof, but 2% by mass or greater of the resin emulsions in the solid content is preferably included in the respective inks.

pH Regulator

A pH regulator is preferably added to the respective inks that configure the ink set according to the embodiment. As the pH regulator, inorganic compounds such as lithium hydroxide, potassium hydroxide, and sodium hydroxide; and alkanolamine such as ammonia, triethanolamine, tripropanolamine, diethanolamine, and monoethanolamine can be used. Particularly, the pH regulator includes at least one kind of pH regulator selected from hydroxide, ammonia, triethanolamine, tripropanolamine of alkali metal, and is to be adjusted to a pH of 6 to pH 10. If the pH is out of this range, a harmful influence may occur in the materials configuring the ink jet printer such that the clogging recoverability is deteriorated.

In addition, if necessary, colidine, imidazole, phosphate, 3-(N-morpholino)propane sulphonate, tris(hydroxymethyl) aminomethane, borate, and the like can be used as a pH buffer.

Other Additives

Further, an anti-foaming agent, an antioxidant, an ultraviolet absorber, preservatives and fungicides, and the like can be added to the respective inks that configure the ink set according to the embodiment.

As the antioxidant and the ultraviolet absorber, allophanates such as allophanate, and methyl allophanate, biurets such as biuret, dimethylbiuret, and tetramethylbiuret, L-ascorbic acid and the salt thereof, Tinuvin 328, 900, 1130, 384, 292, 123, 144, 622, 770, 292, Irgacor 252, 153, Irganox 1010, 1076, 1035, MD1024, and the like manufactured by Nihon Chiba-Geigy K.K., or an oxide of lanthanide, or the like is used.

Examples of the preservative and fungicide include sodium benzoate, pentachlorophenol sodium, sodium 2-pyridinethiol-1-oxide, sodium sorbate, sodium dehydroacetate, and 1,2-dibenzisothiazolin-3-one (Proxel CRL, Proxel BDN, Proxel GXL, Proxel XL-2, and Proxel TN manufactured by Nitto Denko Avecia Inc.).

1.3. Characteristics of Ink Jet Recording Method

The ink jet recording method according to the invention is a method of performing one pass printing recording by using two or more inks in particular without performing two or more instances of superimposed printing using the same ink, the static surface tension difference between the two or more inks is 2 mN/m or lower, and the ink having the lowest $L^*$ value is printed first and the ink having the highest $L^*$ value is printed last.

The $L^*$ value according to the invention means a value that can be obtained by performing spectroscopic analysis by using a spectrophotometer (manufactured by Hitachi, Ltd., Model "U-3000", Used cell: Quartz cell having optical path length of 1 cm, light source of D65, field of view of 2°) on samples in which the respective inks are diluted with water and/or acetone, and calculating the $L^*$ value (brightness) in the $L^*a^*b^*$ color space.

After the ink droplet lands on the recording medium and reaches the equilibrium state, a surface active substance is oriented to the gas-liquid interface of the ink droplet, so the static surface tension is more dominant than the dynamic surface tension. Therefore, the static surface tension differences between the used inks are all set to be mN/m or lower, the ink having the lowest $L^*$ value is printed first, and the ink having the highest $L^*$ value is printed last so that the generation of the bleeding between the colors or the aggregation is suppressed, to realize high quality in the colors. In addition, the bleed-through of the inks can be prevented by causing all of the static surface tension differences of the respective used inks to be 2 mN/m or lower.

In the line head-type ink jet recording apparatus, in order to secure solid filling, the amount of ink used for one dot has to be large, therefore the bleeding phenomenon between the color inks easily occur, and high quality in the colors is not likely to be realized. Here, it has found that the bleeding of the ink having the lowest $L^*$ value into the ink having the highest $L^*$ value can be suppressed by printing the ink having the lowest $L^*$ value first and printing the ink having the highest $L^*$ value last, and the generation of the bleeding between colors can be particularly suppressed by causing the static surface tension differences between the respective inks to be 2 mN/m or lower. If there are two or more inks having static surface tension differences of 2 mN/m or greater, the bleeding or the aggregation of colors is generated and the decrease in the color quality easily occurs.

In addition, the sequence of ejecting the ink in one pass is preferably from the ink having a higher dynamic surface tension. If the printing is performed in the sequence beginning with a higher dynamic surface tension, after the pigment included in the ink in the earlier ejection sequence is partially fixed on the surface of the recording medium, the next ink is easily landed on the recording medium. Therefore, the ink in the earlier ejection sequence and the next ink are not likely to be mixed on the surface of the recording medium, and the generation of the bleeding between colors or the aggregation thereof can be more effectively suppressed.

2. Examples

The embodiment of the invention is described in detail with reference to examples and comparative examples, but the invention is not limited by the embodiment at all.

2.1. Preparation of Pigment Dispersing Liquid 2.1.1. Preparation of Self Dispersion Pigment 500 g of pigment, 1 L of ion exchanged water, and 4-aminophenyl-2-sulphatoethylsulfone (APSES) was introduced to a Processall 4HV mixer (4 liters). Subsequently, after strongly mixing for 10 minutes at 300 rpm, the obtained mixture was heated to 60° C. Here, a 20% aqueous solution of sodium nitride (1 equivalent based on amount of APSES) was added thereto for 15 minutes. Heating and mixing were continued for 3 hours.

The contents of the mixer were extracted by being diluted with 750 mL of ion exchanged water, and subsequently the dispersion liquid obtained by diafiltration using ion exchanged water was refined. When the diafiltration was ended (conductivity of filtrate <200 microsiemens), the concentration of the pigment was adjusted to 15%, and centrifuged with a Carr continuous centrifugal machine (Pilotfuge).

Subsequently, 9.39 g of alendronate sodium (monosodium salt of (4-amino-1-hydroxybutane-1,1-diyl)bisphosphonate) was put into a 2.5 L beaker. 37.56 g of ion exchanged water was added thereto, and subsequently 64.73 g of a 10% aqueous solution of sodium hydroxide was added. The mixture was stirred until the solid was dissolved. 500 g of dispersion liquid (in a 20% solid component) was introduced by pump transport at about 25 mL/minutes under strong stirring. After all the dispersion liquid was added, the pH was measured to check that the pH exceeded 12.5. Mixing was continued for 4 hours at 70° C.

The dispersion liquid obtained in this manner was diluted to a 5% solid content, and diafiltration was performed with ion exchanged water until the pH of the filtrate became less than 8 (after the first diafiltration volume, the retentate was concentrated to 10% solids). The dispersion liquid (adjusted to an approximately 13% solids concentration) was then subjected to an ultrasonic treatment using a Misonix probe sonicator, and centrifuged using a Beckman Ultracentrifuge at 5000 G for 10 minutes, in order to remove large particles so that the pigment dispersing liquid was obtained as presented in Table 2. In addition, the kinds of used pigments were as follows.

Kinds of Used Pigments
  Black pigment dispersing liquid: C.I. Pigment Black 4
  Cyan pigment dispersing liquid: C.I. Pigment Blue 15:3
  Magenta pigment dispersing liquid: C.I. Pigment Red 122
  Yellow pigment dispersing liquid: C.I. Pigment Yellow 74

2.1.2. Preparation of Resin Dispersion Pigment Dispersing Liquid 20 parts by mass of the organic solvent (methyl ethyl ketone), 0.03 parts by mass of a polymerization chain transfer agent (2-mercaptoethanol), polymerization initiator, and respective monomers presented in Table 1 were used and put into the reaction container in which the nitrogen gas substitution was sufficiently performed, polymerization under stirring at 75° C. was performed, 0.9 parts by mass of 2,2'-azobis (2,4-dimethylvaleronitrile) dissolved in 40 parts by mass of methyl ethyl ketone with respect to 100 parts by mass of the monomer component was added, and the resultant was matured for 1 hour at 80° C., so that the polymer solution was obtained.

TABLE 1

| Composition of monomer mixture | Parts by mass |
| --- | --- |
| Polypropylene glycol monomethacrylate (PO = 9) | 15 |
| Poly(ethylene glycol•propylene glycol) monomethacrylate (EO = 5, PO = 7) | 15 |
| Methacrylate | 12 |
| Styrene monomer | 40 |

TABLE 1-continued

| Composition of monomer mixture | Parts by mass |
| --- | --- |
| Styrene macromer | 15 |
| Benzyl methacrylate | 10 |

EO . . . Ethylene oxide
PO . . . Propylene oxide

Subsequently, 7.5 parts by mass of the previously obtained polymer solution as solid content was dissolved in parts by mass of methyl ethyl ketone, a 20% aqueous solution of sodium hydroxide (neutralizer) was added thereto so as to neutralize a salt forming group, 20 parts by mass of the pigment was further added, and kneading was performed for 2 hours by a beads mill. In this manner, after 120 parts by mass of ion exchanged water was added to the obtained kneaded material and stirred, methyl ethyl ketone was removed at 60° C. under reduced pressure, and further some water was removed, so that the resin dispersion pigment dispersing liquid presented in Table 2 was obtained. Further, the kind of used pigment was the same as in the case in which the self dispersion pigment was manufactured.

2.2. Preparation of Resin Emulsion 900 g of ion exchanged water and 1 g of sodium lauryl sulfate are inserted to a reaction container including a stirrer, a reflux condenser, a dropping device, and a thermometer, and the temperature was increased to 70° C. while the nitrogen was substituted under stirring. The internal temperature was maintained at 70° C., 4 g of potassium persulfate was added as a polymerization initiator, emulsion prepared in advance by adding 20 g of acrylamide, 365 g of styrene, 545 g of butylacrylate, and 30 g of methacrylate to 450 g of ion exchanged water and 3 g sodium lauryl sulfate after being dissolved was continuously dripped for 4 hours into the reaction solution. After the dripping was ended, the resultant was matured for 3 hours. The obtained resin emulsion was cooled to room temperature and was adjusted to 25% by mass of solid content and a pH of 8 by adding ion exchanged water and an aqueous solution of sodium hydroxide thereto. The glass transition temperature of the resin particles in the obtained resin emulsion was −6° C.

2.3. Preparation of Ink and Ink Set

With respect to the respective colors of black, magenta, cyan, and yellow, the respective components presented in Table 2 were mixed and stirred for 1 hour, and filtered by a membrane filter having a pore diameter of 5 μm to prepare the respective inks. In this manner, 8 kinds of each of the inks having different dynamic surface tensions and static surface tensions, as in total 32 kinds of black inks (K) A1 to A8, magenta inks (M) A1 to A8, cyan ink (C) A1 to A8, and yellow ink (Y) A1 to A8 were obtained. These inks were combined as presented in Table 3 to obtain the ink sets 1 to 8. In addition, the numerical values in Table 2 indicate contents (% by mass) in the ink.

The compositions of inks A1 to A8 used in the ink sets presented in Table 3 are presented in Table 2. In Table 3, the ink sets (combinations of inks) used in the examples and comparative examples are presented. In addition, values obtained by using the dynamic surface tensions and the static surface tensions of the inks A1 to A8 are also presented in Table 2. The dynamic surface tensions of the respective inks are values measured by using a bubble pressure dynamic surface tensiometer (manufactured by KRUSS GmbH, Model "BP100") at 20° C. The static surface tensions of the respective inks are the values measured with an automatic surface tensiometer (manufactured by Kyowa Interface Science Co., Ltd., Model "DY-300") using the platinum plate at 20° C.

TABLE 2

|  |  | A1 | A2 | A3 | A4 | A5 | A6 | A7 | A8 |
|---|---|---|---|---|---|---|---|---|---|
| Pigment | Self dispersion pigment | 6.0 | 6.0 | 6.0 | 6.0 | 6.0 | 6.0 | — | — |
|  | Resin dispersion pigment | — | — | — | — | — | — | 6.0 | 6.0 |
| Moisturizing agent | Glycerin | 15.0 | 15.0 | 15.0 | 15.0 | 15.0 | 15.0 | 15.0 | 15.0 |
|  | 2-pyrrolidone | 5.0 | 5.0 | 5.0 | 5.0 | 5.0 | 5.0 | 5.0 | 5.0 |
| Diol-based solvent | 1,2-hexanediol | 3.0 | 3.0 | 1.0 | 3.0 | — | 2.0 | 2.0 | 2.0 |
|  | 2,4-diethyl-1,5-pentanediol | — | — | — | — | 3.0 | 3.0 | 3.0 | 3.0 |
| Ether-based solvent | Triethylene glycol monobutyl ether | 2.0 | 2.0 | 2.0 | 4.0 | — | 1.0 | 1.0 | 1.0 |
|  | Polyoxyethylene 2-ethylhexyl ether | — | — | — | — | 2.0 | — | — | — |
| Resin emulsion | Styrene acryl resin (solid content) | 2.0 | 2.0 | 2.0 | 2.0 | 2.0 | 2.0 | 2.0 | 2.0 |
| Surfactant | Acetyl-based surfactant | 0.5 | 1.0 | 0.5 | 0.5 | — | 0.5 | 0.5 | — |
|  | Silicon-based surfactant | — | — | — | — | 0.5 | — | — | 0.5 |
| pH regulator | Trimethylol amine | 0.5 | 0.5 | 0.5 | 0.5 | 0.5 | 0.5 | 0.5 | 0.5 |
| Water | Ion exchanged water | 66.0 | 65.5 | 68.0 | 64.0 | 66.0 | 65.0 | 65.0 | 65.0 |
| Dynamic surface tension (mN/m) |  | 46.0 | 46.0 | 48.0 | 44.0 | 40.0 | 41.0 | 41.0 | 38.0 |
| Static surface tension (mN/m) |  | 32.0 | 31.0 | 33.0 | 31.0 | 28.0 | 30.0 | 30.0 | 27.0 |

In addition, as the acetylene-based surfactant and the silicon-based surfactant in Table 2, the below were used.

Acetylene-based surfactant (manufactured by Air Products and Chemicals, Inc., Product Name "Sufynol 104PG50", 2,4,7,9-tetramethyl-5-decyne-4,7-diol)

Silicon-based surfactant (manufactured by BYK Japan KK, Product Name "BYK-348")

TABLE 3

|  | Ink set 1 | Ink set 2 | Ink set 3 | Ink set 4 | Ink set 5 | Ink set 6 | Ink set 7 | Ink set 8 |
|---|---|---|---|---|---|---|---|---|
| Black Ink (K) | A1 | A3 | A4 | A1 | A2 | A5 | A1 | A3 |
| Cyan Ink (C) | A1 | A1 | A1 | A1 | A1 | A5 | A1 | A1 |
| Magenta Ink (M) | A1 | A1 | A1 | A1 | A1 | A5 | A1 | A1 |
| Yellow Ink (Y) | A6 | A1 | A1 | A2 | A1 | A8 | A7 | A6 |

2.4. Evaluation Method (1) Evaluation of Bleeding

Two kinds of recording paper; plain paper (Xerox 4200 paper) and flier paper (Epson business ink jet printer coated paper) were prepared. In the ink set and the recording condition described in Table 4, an ink jet printer PX-A650 (manufactured by Seiko Epson Corp.) was reformed to a line head printer by arranging heads to be a line head so as to print a special output pattern formed with 400 patches. The permeation of ink into the background in this case was visually determined by using the following criteria. The results thereof are presented in Table 4.
A: Excellent (there is no permeation even in observation by microscope at 30× magnification)
B: Good (characters at font size of 4 points can be read)
C: Possible (characters at font size of 10 points can be read)
D: Impossible (characters at font size of 10 points cannot be read)

(2) Evaluation of Bleed-Through

In the same method as in the bleeding evaluation, Xerox 4200 paper was used as recording paper, and characters at font size of 10 points were printed with KCMY composite black in the concentration of 85% on the recording paper. The paper surface obtained by copying the reverse side of the obtained printed matter by using a copying machine was visually determined based on the criteria below. The results are presented in Table 4 in a combined manner.

A: Excellent (characters at font size of 10 points are not copied in reverse side copy)
B: Good (characters at font size of 10 points are copied in reverse side copy but cannot be read)
C: Possible (characters at font size of 10 points are copied in reverse side copy and can be read)
D: Impossible (ink permeates to reverse side)

2.5. Evaluation Result

The ink sets, the recording conditions, and the results of the evaluation test which were used in the examples and comparative examples are presented in Table 4. In addition, the details of the recording conditions presented in Table 4 are presented in Table 5. In the examples and the comparative examples, the ink having the lowest L* value becomes black ink and the ink having the highest L* value becomes yellow ink.

TABLE 4

|  |  | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|
| Kind of ink set | | Ink set 1 | Ink set 1 | Ink set 2 | Ink set 3 | Ink set 4 | Ink set 5 | Ink set 6 | Ink set 7 | Ink set 1 | Ink set 8 |
| Recording condition | | Recording condition 2 | Recording condition 1 | Recording condition 2 | Recording condition 2 | Recording condition 2 | Recording condition 2 | Recording condition 2 | Recording condition 2 | Recording condition 3 | Recording condition 1 |
| Bleeding evaluation | Plain paper | A | A | B | B | B | A | A | A | C | D |
|  | Flier paper | A | B | B | B | B | B | B | A | C | D |
| Bleed-through | Plain paper | A | B | B | B | B | B | B | A | C | D |

TABLE 5

|  | Recording condition 1 | Recording condition 2 | Recording condition 3 |
|---|---|---|---|
| Black Ink (K) | First | First | Fourth |
| Cyan Ink (C) | Second | Third | Third |
| Magenta Ink (M) | Third | Second | Second |
| Yellow Ink (Y) | Fourth | Fourth | First |

Based on the results in Table 4, according to the ink jet recording methods in Examples 1 to 8, the generation of the bleeding between inks (especially, between colors) can be suppressed so that the bleed-through of the inks in the recording medium can be effectively suppressed.

Meanwhile, in the ink jet recording method of Comparative Example 1, since the yellow ink was used first and the black ink was used last in the recording sequence, the generation of the bleeding and the bleed-through was recognized. In addition, in the ink jet recording method of Comparative Example 2, since the static surface tension difference between the black ink and the yellow ink was 2 mN/m or greater, the bleeding between colors or aggregation was particularly generated so that a significant decrease of the color image quality was recognized.

The present invention is not limited to the embodiments above, and various modifications thereof are possible. For example, the invention includes a configuration which is subsequently the same as the configuration described in the embodiment (for example, the configuration having the same functions, methods, and results). In addition, the invention includes a configuration in which non-essential portions are changed. In addition, the invention includes a configuration having the same effect as the configuration described in the embodiment or a configuration that can achieve the same object. In addition, the invention includes a configuration in which well-known techniques are performed on the configuration described in the embodiment.

The entire disclosure of Japanese Patent Application No. 2014-070977, filed Mar. 31, 2014 is expressly incorporated by reference herein.

What is claimed is:

1. An ink jet recording method, comprising:
   performing one pass printing recording by using two or more kinds of inks,
   wherein static surface tension differences between two or more kinds of inks are all 2 mN/m or lower, and
   the ink with a lowest L* value obtained by analysis of the ink is printed first, and the ink with a highest L* value obtained by analysis of the ink is printed last.

2. The ink jet recording method according to claim 1, wherein a dynamic surface tension of each of the two or more inks when a surface life span is 10 ms is in a range of 37 mN/m to 48 mN/m.

3. The ink jet recording method according to claim 1, wherein each of the two or more inks contains an ethylene oxide adduct of acetylene glycol and 2,4-diethyl-1,5-pentanediol.

4. The ink jet recording method according to claim 1, wherein each of the two or more inks contains a diol-based solvent, and
   the content of the diol-based solvent in the ink with the highest L* value obtained by analysis of the ink is greater than the content of the diol-based solvent in the ink with the lowest L* value obtained by analysis of the ink.

5. The ink jet recording method according to claim 1, wherein each of the two or more inks contains an ether-based solvent, and
   the content of the ether-based solvent in the ink with the highest L* value obtained by analysis of the ink is lower than the content of the ether-based solvent in the ink having with the lowest L* value obtained by analysis of the ink.

6. An ink set used in the ink jet recording method according to claim 1, comprising:
   a black ink;
   a cyan ink;
   a magenta ink; and
   a yellow ink,
   wherein a dynamic surface tension when a surface life span of each of the inks is 10 ms is 37 mN/m to 48 mN/m, and
   static surface tension differences of inks are all 2 mN/m or lower.

7. An ink set used in the ink jet recording method according to claim 2, comprising:
   a black ink;
   a cyan ink;
   a magenta ink; and
   a yellow ink,
   wherein a dynamic surface tension when a surface life span of each of the inks is 10 ms is 37 mN/m to 48 mN/m, and
   static surface tension differences of inks are all 2 mN/m or lower.

8. An ink set used in the ink jet recording method according to claim 3, comprising:
   a black ink;
   a cyan ink;
   a magenta ink; and
   a yellow ink, wherein a dynamic surface tension when a surface life span of each of the inks is 10 ms is 37 mN/m to 48 mN/m, and static surface tension differences of inks are all 2 mN/m or lower.

9. An ink set used in the ink jet recording method according to claim 4, comprising:
- a black ink;
- a cyan ink;
- a magenta ink; and
- a yellow ink, wherein a dynamic surface tension when a surface life span of each of the inks is 10 ms is 37 mN/m to 48 mN/m, and static surface tension differences of inks are all 2 mN/m or lower.

10. An ink set used in the ink jet recording method according to claim 5, comprising:
- a black ink;
- a cyan ink;
- a magenta ink; and
- a yellow ink, wherein a dynamic surface tension when a surface life span of each of the inks is 10 ms is 37 mN/m to 48 mN/m, and static surface tension differences of inks are all 2 mN/m or lower.

11. The ink set according to claim 6, wherein each of the inks contains an ethylene oxide adduct of acetylene glycol and 2,4-diethyl-1,5-pentanediol.

12. The ink set according to claim 6, wherein each of the inks contains a diol-based solvent, and the content of the diol-based solvent in the yellow ink is greater than the content of the diol-based solvent in the black ink.

13. The ink set according to claim 6, wherein each of the inks contains an ether-based solvent, and the content of the ether-based solvent in the yellow ink is lower than the content of the ether-based solvent in the black ink.

* * * * *